Jan. 14, 1969  A. REICHLE ET AL  3,421,857
PYROLYSIS AND REACTION CHAMBER FOR GAS AND CHROMATOGRAPHY
Filed Jan. 14, 1966

INVENTORS:
ALFRED REICHLE, MARTIN WANDEL, HEINRICH BORGER, HUBERT TENGLER.

BY Burgess, Dinklage
& Sprung
ATTORNEYS

United States Patent Office 3,421,857
Patented Jan. 14, 1969

3,421,857
PYROLYSIS AND REACTION CHAMBER
FOR GAS AND CHROMATOGRAPHY
Alfred Reichle, Martin Wandel, Heinrich Borger, and
Hubert Tengler, Dormagen, Germany, assignors to
Farbenfabriken Bayer Aktiengesellschaft, Leverkusen,
Germany, a corporation of Germany
Filed Jan. 14, 1966, Ser. No. 520,587
Claims priority, application Germany, Jan. 19, 1965,
F 27,355
U.S. Cl. 23—253                   5 Claims
Int. Cl. B01d 15/08

ABSTRACT OF THE DISCLOSURE

Pyrolysis and reaction chamber for gas chromatography including a tube closed off at its inlet end by a removable cap and at its outlet end by an inwardly projecting perforated spike spaced from the surrounding tube wall and a plunger carrying a piston-like plug axially movably mounted in the cap, so that upon insertion of a glass ampoule containing an analysis substance through said inlet end and thence closing said end by said cap and plunging said plunger into said tube to cause said plug to shatter said ampoule against said spike, said analysis substance will be released and rapidly exhausted through said outlet end via passage through the spike performations under the piston-like control of said plug.

---

This invention realtes to a pyrolysis and reaction chamber for gas chromatography. The chamber is sealed by a cap which is provided with a spindle which is axially displaceable in the cap so that it can be plunged into the chamber to shatter a glass ampoule which contains an analysis substance which can be introduced into the chamber. The closed chamber through which the carrier gas of the chromatograph flows, is adapted to be heated.

After pyrolysis has been in progress for any desired period, the ampoule is shattered by lowering the spindle, after which the volatile contents of the ampoule are simultaneously flushed with the carrier gas into the gas chromatograph and spearated by gas chromatography.

One disadvantage of known pyrolysis and reaction chambers of this general kind is that the space which the analysis substance can fill after the ampoule has been shattered is at least as large as the ampoule itself before shattering. The time required to flush the substances into the column of the gas chromatograph is proportionately long, resulting in the formation of correspondingly wide peaks. In a pyrolysis chamber of this known kind, there is also the danger of splinters of the shattered ampoule dropping into the carrier gas outlet of the chamber, thus blocking it.

It has now been found that these disadvantages can be obviated if, in accordance with the invention, the end of the spindle facing towards the ampoule is provided with a piston-like plug or stopper, and if a central, perforated hollow spike is arranged on the inside of the chamber outlet coaxially of and at a distance from the chamber wall so that it projects into the chamber where it acts as a rest or support for the ampoule.

In this way, the substances to be analysed are forced out of the chamber outlet by means of the piston-like plug after the ampoule has been shattered, and are rapidly flushed into the gas-chromatography column. The volatile products of pyrolysis do not block up the outlet as they are being forced out because the hollow spike acts as a sieve, whilst the glass splinters from the shattered ampoule are collected in the annular space between the hollow spike and the wall of the chamber.

This arrangement enables chemical reactions to be carried out at elevated temperature with addition of catalysts and reaction components.

The stream of carrier gas prevents the analysis substance from diffusing back into the chamber behind the piston-like plug.

The arrangement may be used, for instance, for the following purposes: detecting water in fibres and plastics, detecting organic solvents in fibres, films and lacquers, detecting plasticizers and plastics, for the pyrolysis of high polymers in any kind of atmosphere or in vacuum, and for reaction chromatography.

The subject of the invention is diagrammatically illustrated by way of example in the drawings, wherein.

Figure 1:
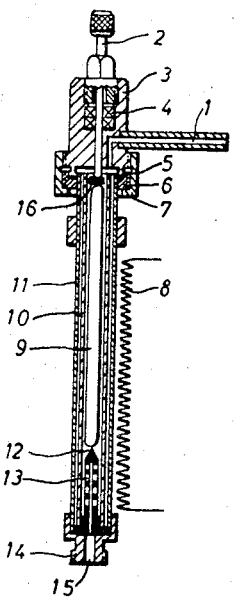
FIG. 1 is a longitudinal section through the pyrolysis chamber.

The pyrolysis chamber comprises an externally heatable metal tube 11 which is heated by a heating coil 8 with, for example an output of 250 watts. The required temperature may be adjusted by means of a regulating transformer (not shown). A temperature of 500° C. can be reached inside the apparatus. Corerspondingly higher temperatures can be reached with different heating systems.

Arranged inside the metal tube is a removable metal sleeve 10 at the bottom of which is an unscrewable hollow spike 12 formed with perforations 13, and at the top of which is a closure cap 3 joined to tube 11 at flange collar 7 via the screw-threaded connection 6. The pyrolysis chamber and the injection block of the gas chromatograph are joined together by way of a screw-threaded connection 14. After the closure cap 3 has been unscrewed, a sealed glass ampoule 9 containing the analysis substance can be introduced into the metal sleeve 10. One end of the sealed glass ampoule 9 rests on the tip of the spike 12. Arranged centrally in the closure cap 3 is an axially movable plunger 2 which carries a piston-like plug 16 at the end facing towards the ampoule, the function of which is to shatter the glass ampoule 9. A white asbestos seal 4 is provided between the plug 16 and the closure 3. The closure 3 is sealed of from the pyrolysis chamber 11 by a Klingerit washer 5. Also arranged inside the closure cap 3 is a supply pipe 1 for the carrier gas which leaves the pyrolysis chamber through a nozzle or spout 15 and, at the same time, flows into the gas chromatograph (see FIG. 2).

Figure 2:
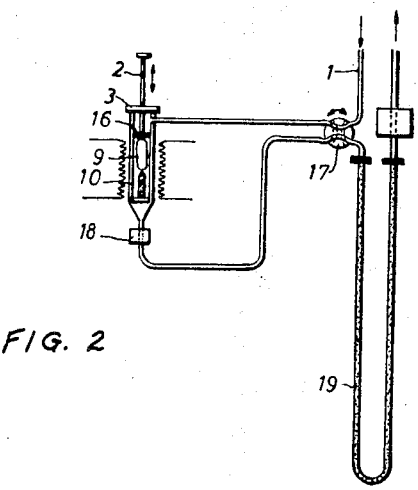
FIG. 2 shows the pyrolysis chamber in the carrier gas stream of a gas chromatograph.

A typical pyrolysis reaction will now be described in detail with reference to FIG. 2. In order to introduce the sample, the closure cap 3 of the pyrolysis chamber is unscrewed. The analysis substance contained in a sealed glass ampoule 9 is introduced into the pyrolysis chamber which is then closed again. The carrier gas flows from supply pipe 1 through a gas-reversing valve 17, turned through 90°, into the chamber from which it displaces the air. At the same time, the tube 11 is heated.

On completion of pyrolysis, the glass ampoule is shattered by depressing the plunger 2 with the plug 16. At the same time, the products of thermal decomposition are flushed through the injection block 18 and the gas-reversing valve 17 into a gas-chromatographic separating column 19. When the volatile products of pyrolysis have passed from the pyrolysis chamber into the separating column 19 (which takes about a minute), the gas-reversing valve 17 can be turned back, as shown in FIG. 2, so that the carrier gas flows from the supply pipe 1 through the reversing valve 17 directly into the separating column 19, in which it serves to carry and separate the volatile products of decomposition.

The pyrolysis chamber can then be opened so that first of all the glass splinters from the ampoule and then the involatile residues of pyrolysis can be removed by withdrawing the metal sleeve 10. On completion of separation by gas chromatography, the gas-reversing valve 17 is again rotated through 90°, so that a new analysis substance can be introduced into the column.

We claim:

1. Pyrolysis and reaction chamber for gas chromatography which comprises a tubular chamber having a plunger end and a gas exhausting outlet end, a cap closing said plunger end and an inwardly projecting perforated hollow spike spaced from the chamber wall and closing said outlet end, and a plunger having a piston-like plug at one end thereof axially movably mounted in said cap with said plung facing the interior of said chamber, said chamber being adapted to receive a shatterable glass ampoule containing an analysis substance to permit the plunging of said plunger into said chamber to cause said plug to shatter such ampoule against said spike for release of such analysis substance and controlled rapid exhausting of such analysis substance through said outlet end via the perforations in said spike.

2. Chamber according to claim 1 wherein a carrier gas inlet is defined in said chamber at the plunger end thereof to permit carrier gas to flush such analysis substance out through said outlet end via the perforated spike after such ampoule has been shattered to release such analysis substance.

3. Chamber according to claim 1 wherein said spike is in the form of a hollow spike-shaped sieve.

4. Chamber according to claim 1 wherein externally arranged heating means are provided to heat the contents of such ampoule within said chamber.

5. Chamber according to claim 1 wherein said cap removably closes said plunger end of said chamber to permit such ampoule to be inserted into said chamber through said plunger end.

References Cited

UNITED STATES PATENTS 1,680,616   8/1928   Horst _____ 23—292

MORRIS O. WOLK, *Primary Examiner.*

R. E. SERWIN, *Assistant Examiner.*

U.S. Cl. X.R.

23—292; 141—330; 206—47